United States Patent [19]
Ehlerding

[11] Patent Number: 5,574,348
[45] Date of Patent: Nov. 12, 1996

[54] TOOL SUPPORT

[76] Inventor: Andreas Ehlerding, Sachsenhäger Str. 3, D-31718 Pollhagen, Germany

[21] Appl. No.: 182,022

[22] PCT Filed: Jul. 10, 1992

[86] PCT No.: PCT/EP92/01567

§ 371 Date: Nov. 17, 1994

§ 102(e) Date: Nov. 17, 1994

[87] PCT Pub. No.: WO93/01021

PCT Pub. Date: Jan. 21, 1993

[30] Foreign Application Priority Data

Jul. 13, 1991 [DE] Germany ............................. 41 23 323.9

[51] Int. Cl.$^6$ .......................... G05B 19/18; G05B 19/407
[52] U.S. Cl. ........................ 318/575; 318/571; 318/572; 318/640
[58] Field of Search .................... 318/560–646; 364/474.01–474.39; 178/18, 98; 33/18.1, 434, 1 M, 189, 32.3, 184.5; 250/548, 237 R, 559.3; 83/412, 76.6, 169; 358/482, 500, 465; 346/33 R, 139 C; 395/103; 356/357, 5.01

[56] References Cited

U.S. PATENT DOCUMENTS

| | | | |
|---|---|---|---|
| 3,555,254 | 1/1971 | Gerber | 318/568 |
| 3,619,755 | 11/1971 | Munro | 318/568 |
| 3,873,769 | 3/1975 | Cotter | 178/18 |
| 3,889,164 | 6/1975 | Nishizawa et al. | 318/640 |
| 4,456,863 | 6/1984 | Matusek | 318/572 |
| 4,594,671 | 6/1986 | Sugimoto et al. . | |
| 4,654,571 | 3/1987 | Hinds | 318/687 |
| 4,659,902 | 4/1987 | Swensrud et al. | 219/121 LU |
| 4,698,575 | 10/1987 | Bouwer | 318/640 |
| 4,734,866 | 3/1988 | Bartelt et al. . | |
| 4,754,208 | 6/1988 | Nakajima et al. | 318/574 |
| 4,908,555 | 3/1990 | Ikeda et al. | 318/567 |
| 5,140,242 | 8/1992 | Doran et al. | 318/640 |
| 5,177,421 | 1/1993 | Sasaki et al. | 318/571 |
| 5,210,478 | 5/1993 | Sasaki et al. | 318/632 |

FOREIGN PATENT DOCUMENTS

| | | |
|---|---|---|
| 0086950 | 8/1983 | European Pat. Off. . |
| 0381155 | 8/1990 | European Pat. Off. . |
| 3627560 | 2/1988 | Germany . |
| 2040074 | 8/1980 | United Kingdom . |

*Primary Examiner*—Paul Ip
*Attorney, Agent, or Firm*—Shlesinger, Arkwright & Garvey

[57] ABSTRACT

A tool-receiving system 14 displaceable in one, two or three dimensions is mounted on a tool support 6 displaceable in two or three dimensions relative to the 2-dimensional or, e.g., 3-dimensional processing or drawing surface. System 14 is amenable to higher acceleration than the tool support 6. A device 30 coordinates the superposed components of displacements of tool support 6 and/or tool-receiving system 14 in such a way that the resulting maximum acceleration of the overall equipment corresponds at least to the acceleration of the system 14.

19 Claims, 2 Drawing Sheets

TOOL SUPPORT

FIELD OF THE INVENTION

The invention concerns a tool support for processing machinery and machine tools, and in particular for automatic drawing instruments.

Frequently a number of conflicting requirements are present when designing a machine tool, namely

BACKGROUND OF THE INVENTION 1. low weight,
2. high strength,
3. wide processing range,
4. high accelerations of axis motions in order to
   (a) achieve constant operational rates even at small radii or corners, and
   (b) achieve the highest possible overall operational rates even for very complex processing contours.

Almost any conceivable axis drive exists for laser cutters designed for processing planar materials. The most important three (3) drives are:

1. Table at rest, portal being moved in the x-direction while the tool support affixed on the z-axis is being moved in the y-direction,
2. Compound table for the x and y axes, the material in the laser beam being moved on said table and a z-axis which ensures the proper height of the tool above the workpiece.
3. Table moved in the x-direction underneath a portal or through a stable arm used to shift the y-axis with integrated z-axis.

All these designs incur a common problem:

Even though the actual tool is merely a light beam applied by optical devices (mirrors and lenses) of comparatively low inertia to the material and even though direct processing forces do not arise that would have to be absorbed by the machine frame, the known designs are fairly high in mass. Illustratively, machines with a working range of 3×2 m as a rule weigh between 5 and 10 metric tons. The heaviest parts which must be moved with designs using a compound table for that kind of a design weight up to 5 metric tons and, as regards the design with movable portal ("flying optics"), weigh between 500 and 1,000 kg.

Considering the movable portal design, these weights arise from two (2) main requirements:

1. The large portal span, and
2. The required strength to guide the tool support including the z-axis and the required optical devices with little vibration, accurately and as high as possible an acceleration.

The drives, especially to move the portal in the x-direction, accordingly are very powerful. Motors, gear units and shafts must withstand very high loads. If simultaneously precision is demanded, new problems and substantial costs arise because low-play gear-units and motors responding precisely to even minute signals are very complex and, hence, costly in such sizes.

Nevertheless, the resulting costly and heavy machines still are substantially too inert at their maximum acceleration of about 0.5 g in many applications to economically make use of the available laser power, for instance when, for serial cutting of small parts, for artistic shapes for advertising, and for filigrees, very tight radii must be transited in rapid sequences, the possible cutting speeds frequently being about 20 m/min. At a maximum acceleration of about 0.5 g, only radii up to about 15 mm can be transited at full speed.

This magnitude however is more theoretical than practical, because the resulting stresses on all parts of the drive would cause substantial wear and hence long shutdown times and consequential expenditures, so that economical operation is frequently precluded, the more so that even this acceleration anyway is insufficient for adequately constant and simultaneously high speed in many cases (corners and small radii of about a few mm).

Similar conditions apply also to other processing modes, for instance high-speed milling of light metals, and for engraving or plotting equipment.

OBJECTS AND SUMMARY OF THE INVENTION

The object of the present invention is to so design a tool support of the above-described kind that achieves high constant operational rates and/or shorter paths of acceleration, in particular with the processing of contours evincing many small radii and corners.

This problem is solved by the design characterized in claim 1.

Advantageous and appropriate further developments are stated in the sub-claims.

The invention is elucidated below in relation to an illustrative embodiment shown in the attached drawing.

DETAILED DESCRIPTION OF THE INVENTION

Figure 1:
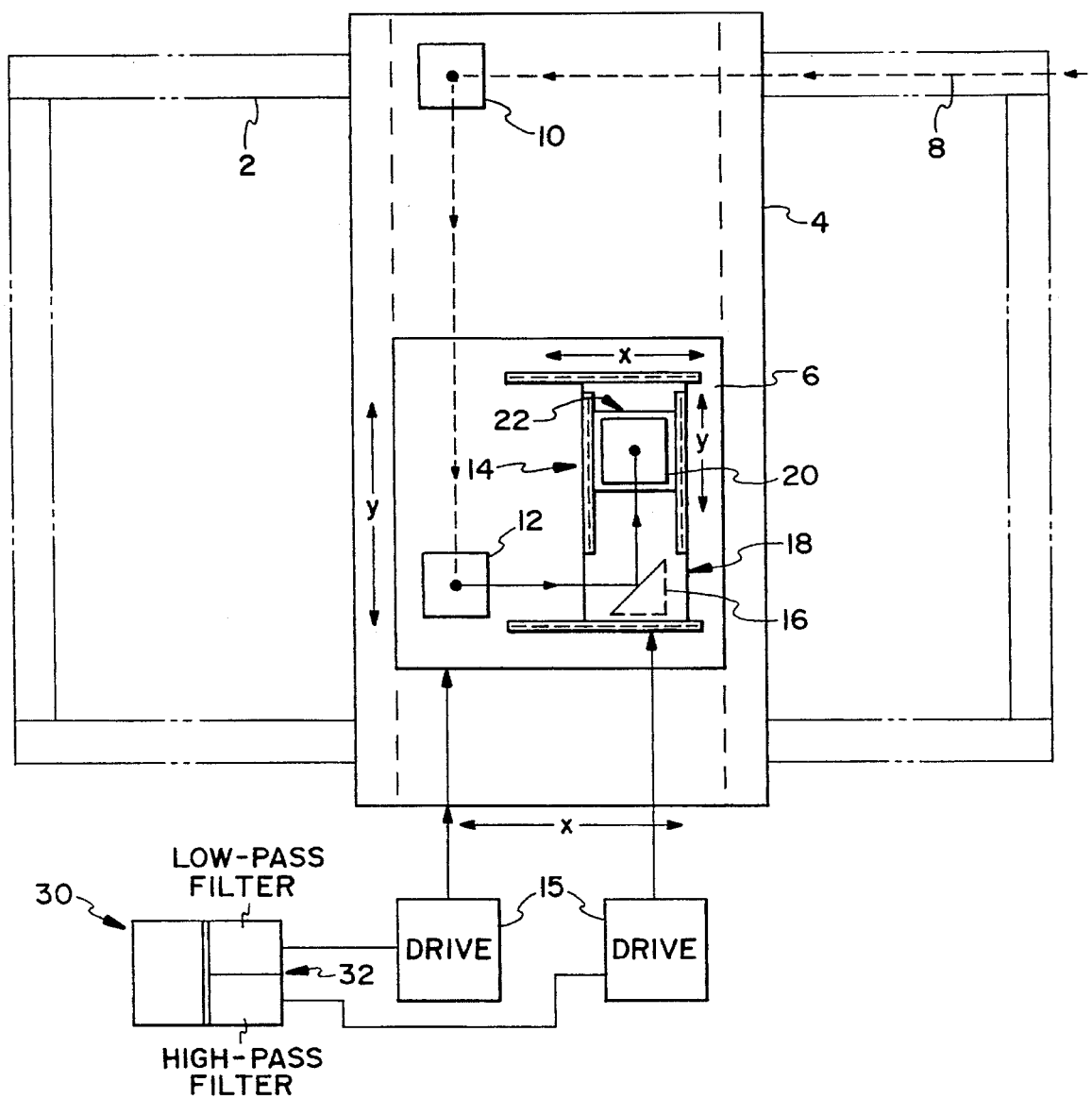
FIG. 1 is a schematic of a portal-mounted tool support of a machine tool to process a workpiece by means of a laser beam.
Figure 2:
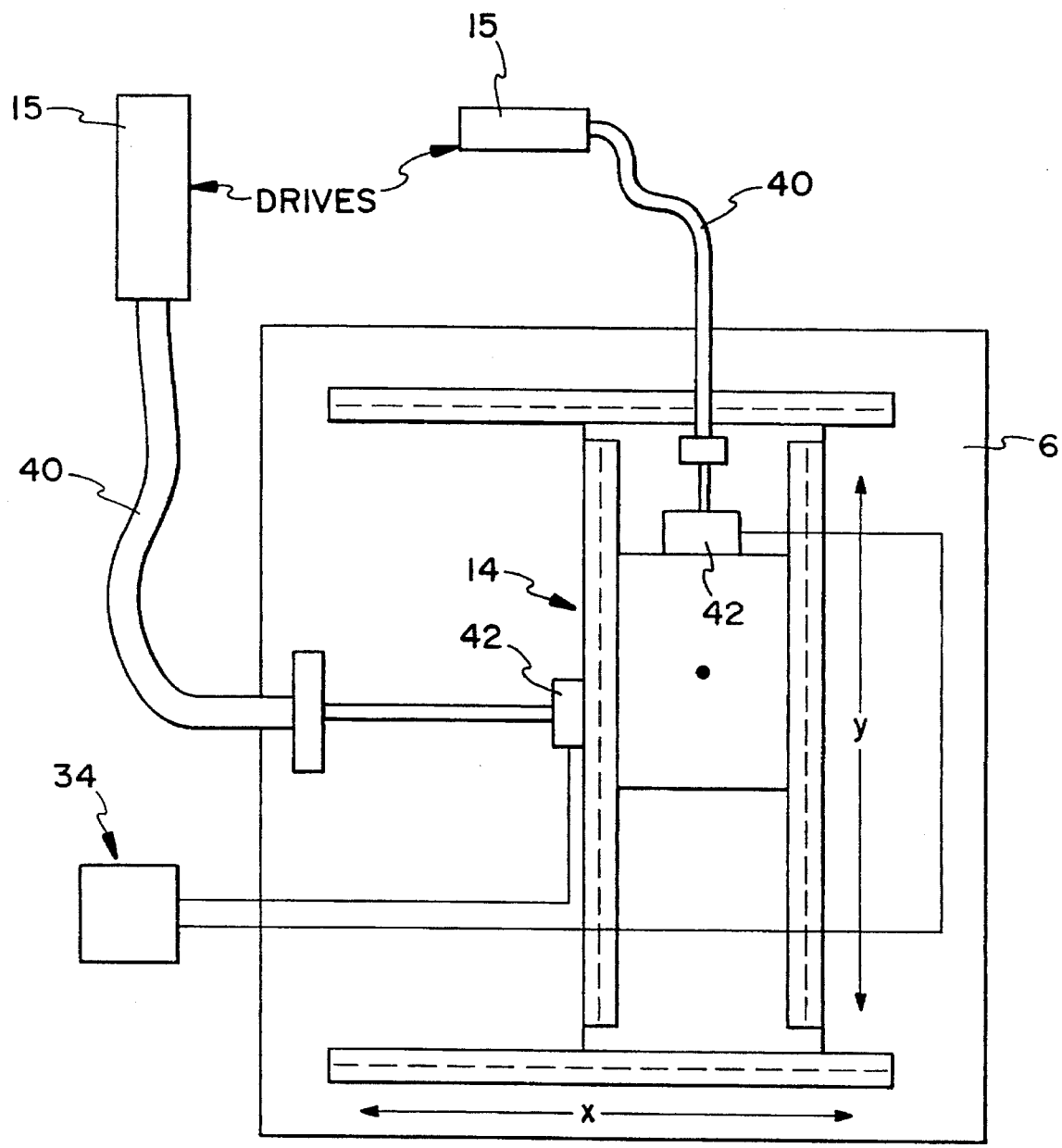
FIG. 2 is a schematic of a special embodiment of a tool support.

FIGS. 1 and 2 show part of a machine tool for laser processing, comprising a guide rail 2 on which a portal 4 can be displaced in the x-direction. A tool support 6 displaceable in the y-direction is mounted on the portal and comprises a z-direction axis.

A system 14 bearing the "tool" is mounted on the tool support 6 and is displaceable in both x- and y-directions. The tool-bearing or tool-receiving system 14 allows an additional displacement in the x- and y-directions that is superposed on the displacement of the portal and the tool support.

A device 30 serves to coordinate the superposed components of displacement in such manner that the resulting maximum acceleration of the overall equipment depends on the maximum acceleration of the system 14.

The device 30 may be part of a CNC (Computer Numerical Control) device which by means of software or corresponding hardware generates the control signals for the axes of the tool support 6 and for the corresponding axes of the tool-bearing system 14 in such a way that the axes of the system 14 receive the displacement components of a higher acceleration than the maximum acceleration of tool support 6.

The device 30 also can be fed from a CNC for each axis with a signal corresponding to the required overall displacement. The device 30 splits the signal into signal portions assigned to the displacement components of tool support 6 and system 14 to control the axis components of tool support 6 and the system 14. Omitted equipment to determine spaceand/or speed-dependent signals is provided, said signals being fed to the device 30 wherein they are added in relation to the axes. The resulting signals are returned to the CNC as feedback signals. Electronic filters 32 are provided to split the signal into the particular axis components of tool support 6 and tool-bearing system 14, the control signal portions for the tool support being generated by a low-pass filter and the control signal portions for system 14 being generated by a high-pass filter. Preferably the same cutoff frequency is provided to tune the low and high pass filters.

A laser beam 8 is deflected by a first mirror 10 mounted on portal 4 toward a deflection mirror 12 stationary on tool support 6.

Tool-bearing system 14 comprises a first deflection mirror 16 which is displaceable in the x-direction and relative to stationary deflection mirror 12. For that purpose the deflection mirror 16 is mounted on a first mirror support 18 which is displaceable in the x-direction.

A second deflection mirror 20 is mounted on first mirror support 18 so as to be displaceable in the y-direction and relative to the first deflection mirror 16, said second deflection mirror 20 being affixed on a second mirror 22 displaceable in the y-direction on the first mirror support 18.

On account of the described design of the tool support 6, the displacement both in the x- and in the y-directions is composed in each case of two superposed displacements; the displacement of both the system 14 is a superposed on the displacements of the portal 4 and of the tool support 6.

Compared with the assembly of portal and tool support, the system tool-bearing 14 evinces much less weight, as a result of which this system 14 can achieve substantially higher accelerations at comparatively lower constructional complexity than the assembly of portal and tool support. Therefore this design offers the advantage of achieving substantially higher operational rates by means of the tool-bearing system 14. Within specific limits, the displacement of the portal and of the tool support may follow the displacement of said system, without problems arising thereby concerning the operational rates.

The maximum displacements required for the system 14 so that the following assembly of portal and tool support be accelerated to the final speed without thereby the total acceleration dropping below the magnitudes of the system 14 in the x- and y-directions approximately are $2(v_e^2/2b)$, where $v_e$ is the desired final speed and b is the acceleration of portal and tool support in x- and y-directions. The factor of 2 takes into account that the required compensatory displacements must be possible in both directions of displacement (positive and negative) of the x- and y-axes.

In this manner a machine tool is made of which the highest processing speed shall be 20 m/min and of which the assembly of portal and tool support achieves an acceleration of 0.1 g and a maximum displacement of the tool-bearing system 14 in the x- and y-direction each time of 11 cm. Accordingly the system 14 on the tool support must be able to move each time out of a neutral null position by 11/2 cm, i.e., by 5.5 cm. The possible acceleration of the system 14 at the same time is the possible acceleration of the overall machine tool.

Because a drive 15 for the system 14 can be selected by fully different criteria than for the assembly of portal and tool support, very high accelerations can be achieved. A magnitude of 5 g and above is achievable. At the cited speed of 20 m/min, it is possible thereby to control a radius of curvature of less than 1.5 mm without incurring a delay.

The described preferred embodiment also is suitable for other variations such as a compound table, because the quality of the laser beam is hardly affected by mounting a small and rugged system 14 fitted with deflection mirrors above the workpiece, while on the other hand the table can be moved into position very gently. In this design, too, high effective accelerations can be achieved.

In many applications the displacements of tool-bearing system 14 are comparatively large (several cm), and therefore when modern drives are used, such as linear motors, an unfavorable ratio arises between the moved masses of the tool and the drive.

This problem can be remedied for a slight, moved mass of tool by shifting the drive unit (motor) 15 from tool-bearing system 14 either onto the tool support 6 or next to the machine. The linear or rotary motion generated in the drive unit or drive 15 can then be transmitted by a flexible shaft or a bowden cable 40 to the system 14 and at that site may be used to drive a spindle or a linear guide means.

Because of the high elasticity of the system 40, compensation of displacement errors at high speeds will frequently be required. This is accomplished by a short-excursion drive component 42 such as a piezoelectric crystal or an electromagnetic component which is inserted directly into the path of power transmission in front of the axes of tool-bearing system 14. The drive components 42 are controlled by a device 34 generating the required correction signals, for instance by feedback through the measuring system of axes of system 14.

Similar problems as found in machine tools are encountered in automatic drawing instruments, the so-called plotters, and accordingly the above described tool support is also applicable to plotters. This is especially the case for plotters moving in one direction of the drawing medium, for instance paper. Using tool support 6 with tool-bearing system 14 comprising a displacement axis parallel to the paper motion and in the form of a penholder instead of the conventional penholder, then keeping the drawing speed constant, substantially lesser force need be applied to the drawing medium, or, conversely, keeping the force constant, higher drawing speeds will be possible.

I claim:

1. An apparatus for controlled movement and maximum acceleration of machine tools, comprising:
   a) a tool support movably supported adjacent to a work surface for movement in at least two dimensions relative to a work surface;
   b) a tool-receiving system configured for receiving a tool;
   c) said tool-receiving system being movably supported on said tool support for movement in at least one dimension relative to said tool support;
   d) a tool support drive provided for accelerating and driving said tool support;
   e) a tool-receiving system drive for accelerating and driving said tool-receiving system;
   f) a control device operatively connected to said tool support drive and said tool-receiving system drive; and
   g) said control device coordinating relative movement of said tool support and said tool-receiving system for accelerating said tool-receiving system at an effective overall rate of acceleration that corresponds to at least the rate of acceleration provided by said tool-receiving system.

2. An apparatus as defined in claim 1, wherein:
   a) said tool-receiving system is smaller than said tool support.

3. An apparatus as defined in claim 1, wherein:

a) said tool-receiving system is disposed on said tool support for movement parallel to the movement of said tool support.

4. An apparatus as defined in claim 1, wherein:

a) said control device includes a computer numerical control (CNC) device.

5. An apparatus as defined in claim 1, wherein:

a) said tool support is disposed for movement along at least two transverse axes;

b) said tool-receiving system is disposed for movement along at least one axis relative to said tool support;

c) said control device is configured for receiving one signal per axis corresponding to a desired overall motion of said tool-receiving system along such an axis, and said control device splits the one signal per axis into a signal component for causing said drive to move said tool support and a further signal component for causing said drive to drive said tool-receiving system to achieve the desired overall motion.

6. An apparatus as defined in claim 5, wherein:

a) said control device includes electronic filters for splitting the received one signal per axis.

7. An apparatus as defined in claim 6, wherein:

a) said electronic filters include low pass and high pass filters.

8. An apparatus as defined in claim 7, wherein:

a) said low pass and high pass filters use the same cutoff frequency.

9. An apparatus as defined in claim 1, wherein:

a) a fixed deflection mirror is mounted on said tool support;

b) said fixed deflection mirror is fixed relative to said tool support;

c) said tool-receiving system includes at least one deflection mirror; and d) said at least one deflection mirror is movable relative to said fixed deflection mirror on said tool support.

10. An apparatus as defined in claim 1, wherein:

a) a portal is disposed between said tool support and a work surface;

b) said portal is movable in at least one dimension relative to a work surface;

c) said tool support is movable in at least one dimension relative to said portal;

d) a first deflection mirror is provided on said tool-receiving system;

e) said first deflection mirror is movable relative to said tool-receiving system:

f) a fixed deflection mirror is mounted on said tool support;

g) said fixed deflection mirror is fixed relative to said tool support;

h) said first deflection mirror is movable relative to the fixed deflection mirror on said tool support;

i) a second deflection mirror is provided on said tool-receiving system; and j) said second deflection mirror is movable transversely relative to said first deflection mirror.

11. An apparatus as defined in claim 10, wherein:

a) said first and second deflection mirrors are mounted on a first driven mirror support; and b) said first driven mirror support is movable relative to said fixed deflection mirror on said tool support.

12. An apparatus as defined in claim 11, wherein:

a) said second deflection mirror is mounted on a second driven mirror support.

13. An apparatus as defined in claim 14, wherein:

a) said drive is located remote from at least one of said tool support and said tool-receiving system.

14. An apparatus as defined in claim 13, wherein:

a) said drive includes bowden cables extending from said drive to said tool support and tool-receiving system.

15. An apparatus as defined in claim 1, wherein:

a) a drive component is provided for providing corrective drive inputs for compensating for inaccuracies in the accelerating and driving of said tool support and said tool-receiving system by said drive.

16. An apparatus as defined in claim 1, wherein:

a) said tool-receiving system includes a drawing pen.

17. An apparatus as defined in claim 16, wherein:

a) said tool support is configured for moving a piece of paper relative to said drawing pen; and b) said tool-receiving system is movable in the same dimension and direction of displacement as a piece of paper moved by said tool support.

18. An apparatus for controlled movement and maximum acceleration of machine tools, comprising:

a) means provided for supporting a tool adjacent to a work surface for movement in at least two dimensions relative to a work surface;

b) means provided for receiving a tool;

c) said tool-receiving means being movably supported on said tool supporting means for movement in at least one dimension relative to said tool supporting means;

d) means provided for accelerating and driving said tool supporting means and said tool-receiving means;

e) means operatively connected to said drive means, said tool supporting means and said tool-receiving means for controlling each one thereof; and f) said control means coordinating relative movement of said tool supporting means and said tool-receiving means for thereby accelerating said tool-receiving means for thereby accelerating said tool-receiving means at an overall rate of acceleration that corresponds to at least the rate of acceleration provided by said tool-receiving means alone.

19. An apparatus as defined in claim 18, wherein:

a) said tool-receiving means is disposed on said tool supporting means for movement parallel to the movement of said tool supporting means.

* * * * *